United States Patent
Jain

(10) Patent No.: US 10,560,540 B2
(45) Date of Patent: Feb. 11, 2020

(54) OPTIMIZING PROVISIONING OF JAVA-BASED WEB APPLICATIONS ON PAAS LIKE CLOUD FOUNDRY

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 15/375,782

(22) Filed: Dec. 12, 2016

(65) Prior Publication Data

US 2018/0167480 A1 Jun. 14, 2018

(51) Int. Cl.
| | | |
|---|---|---|
| G06F 8/41 | (2018.01) | |
| H04L 29/08 | (2006.01) | |
| G06F 8/30 | (2018.01) | |
| G06F 9/455 | (2018.01) | |
| H04L 29/06 | (2006.01) | |

(52) U.S. Cl.
CPC ............ *H04L 67/2828* (2013.01); *G06F 8/30* (2013.01); *G06F 8/41* (2013.01); *G06F 8/433* (2013.01); *G06F 8/4434* (2013.01); *G06F 9/45504* (2013.01); *H04L 67/02* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2005/0021995 A1* | 1/2005 | Lal | ............... | G06F 21/10 726/4 |
| 2012/0324417 A1* | 12/2012 | Somani | ............... | G06F 8/30 717/101 |
| 2014/0025723 A1* | 1/2014 | Xu | ............... | H04L 67/1091 709/203 |
| 2014/0123129 A1* | 5/2014 | Risbood | ............... | G06F 9/44505 717/176 |
| 2017/0322934 A1* | 11/2017 | Chen | ............... | G06F 8/71 |
| 2018/0113684 A1* | 4/2018 | Dawson | ............... | G06F 8/36 |

OTHER PUBLICATIONS

Ertman, Bert. "Building Modular Cloud Applications in Java", Java Magazine, Voxxed.com, Feb. 17, 2015 [retrieved on Jun. 6, 2018]. Retrieved from the Internet: <URL:https://www.voxxed.com/2015/02/building-modular-cloud-applications-in-java/>. (Year: 2015).*
Bakker, et al. "Building Modular Cloud Apps with OSGi", O'Reilly Media, Inc., Sep. 2013, (citing Chapter 10), ISBN 9781449345150 [retrieved on Dec. 17, 2018]. Retrieved from the Internet: <URL: https://learning.oreilly.com/library/view/building-modular-cloud/9781449345143>. (Year: 2013).*

* cited by examiner

*Primary Examiner* — Kevin T Bates
*Assistant Examiner* — Dae Kim
(74) *Attorney, Agent, or Firm* — Buckley, Maschoff & Talwalkar LLC

(57) ABSTRACT

A system and method of reducing network bandwidth for application development are provided. The method comprises receiving from a developer platform (i) core application software and (ii) dependency software associated with the core application software. The compiled dependency software is transmitted to a first server associated with cloud storage. The compiled core application software is transmitted to a second server associated with the cloud storage. An application based on the compiled core application software and the compiled dependency software may be executed.

18 Claims, 5 Drawing Sheets

| Software ID 502 | Software Attribute 504 | Software Attribute 506 | Software Attribute 508 |
|---|---|---|---|
| 1 | | | |
| 2 | | | |
| 3 | | | |

FIG. 5

OPTIMIZING PROVISIONING OF JAVA-BASED WEB APPLICATIONS ON PAAS LIKE CLOUD FOUNDRY

BACKGROUND

Platform as a service ("PaaS") relates to a cloud computing model that delivers applications over the Internet or other large networks (e.g., a WAN or MAN). A PaaS provider typically hosts both the hardware and software on its own infrastructure. As such, PaaS users and developers do not have to install specialized hardware to develop or run a new application since all development and production may be executed on the PaaS infrastructure. The PaaS infrastructure may be situated in a data center where traffic between servers may be defined as East-West traffic while traffic going in and out of the data center may be defined as North-South traffic (e.g., internet traffic).

Some programming languages, such as, but not limited to, Java may utilize dependency software that is static and does change even if the core software elements of an application are modified. During development of software applications, each time an application is to be executed, the core programming language files and the dependency software are packaged together and then deployed/transmitted to the PaaS infrastructure where they are executed. During times of development, a data center's North-South traffic may increase substantially as files are transferred to the data center from developers. This increased traffic may be costly (e.g., fees associated with bandwidth) as well creating potential bottlenecks for routers and switches that have to handle an increase of incoming and outgoing traffic. Therefore, a method and system to reduce North-South traffic associated with PaaS-like infrastructures is desirable.

BRIEF DESCRIPTION OF THE DRAWINGS

FIG. 5 illustrates a portion of a database table according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

The present embodiments relate to reducing North-South traffic by reducing a size of an application archive, such as, but not limited to, a Java web artifact that is transmitted to a PaaS-like architecture. Reducing the size of the application archive may reduce an amount of network bandwidth being used for transmitting/receiving application archives. Reducing network bandwidth may also reduce costs associated with the transfer of the application archives. In particular, the embodiments described herein may reduce North-South traffic by shifting a portion of the traffic towards an East-West traffic pattern within a data center.

Figure 1:
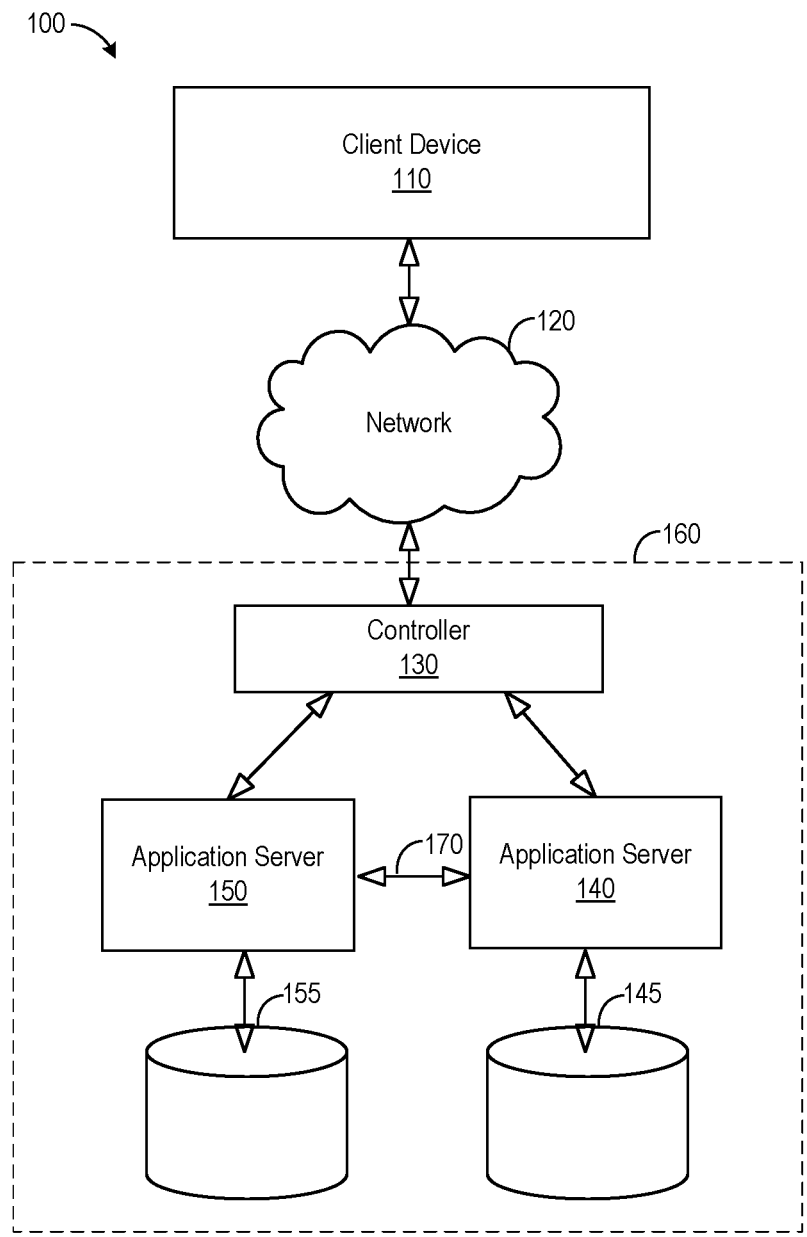
FIG. 1 is a block diagram of a system according to some embodiments.

FIG. 1 is a block diagram of system 100 according to some embodiments. System 100 includes a client device 110, a network 120, and cloud storage system 160. The client 110 may comprise one or more devices used for developing program code that will executed on the cloud storage system 160. For example, the client 110 may comprise a developer device such as a desktop computer or a laptop. The network 120 may comprise an intranet, an internet such as the World Wide Web, a local area network (LAN), a wide area network (WAN) or a metropolitan area network (MAN). Traffic between the client device 110 and cloud storage system 160 may comprise North-South traffic (e.g., traffic over the network 120).

The cloud storage system 160 may comprise a PaaS-like architecture where data is stored in logical pools while physical storage spans multiple servers such as servers 140/150 and, in some embodiments, multiple locations. Each server 140/150 may comprise a computing device that processes requests using a computer processor. For example, each application server 140/150 may support server-side scripting using Active Server Pages (ASP), Personal Home Page (PHP), or other scripting languages.

The cloud storage system 160 may be accessed through a controller 130 such as, but not limited to, a PaaS controller that may be co-located with the cloud storage system 160. Furthermore, the controller 130 may control storage associated with the one or more servers 140/150. Each server 140/150 may be associated with one or more storage devices 145/155 and each server 140/150 may communicate with each other via a data center network 170 (e.g., East-West traffic). In some embodiments, the storage devices 145/155 may be part of a storage area network. In some embodiments, the cloud storage system 160 may comprise a blob-store which stores a plurality of Binary Large Objects (BLOBs) as a single entity in or across storage devices 145/155. Each storage device 145/155 may comprise any query-responsive data source or sources that are or become known, including but not limited to a structured-query language (SQL) relational database management system. In some embodiments, data stored in each storage device 145/155 may be stored as part of a relational database, a blobstore, a multi-dimensional database, an eXtendable Markup Language (XML) document, or any other data storage system storing structured and/or unstructured data. The data may be distributed among several relational databases, multi-dimensional databases, and/or other data sources. In some embodiments, each storage device 145/155 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources.

The present system design may facilitate the reduction of North-South network bandwidth. For purposes of illustrating features of the present embodiments, a simple example will now be introduced and referenced throughout the disclosure. Those skilled in the art will recognize that this example is illustrative and not limiting and is provided purely for explanatory purposes.

In this example, an application with 100 classes may have a size of 100 KB. However, the application may also be associated with dependency software having a size of 5000 KB. For example, an application's dependencies may be based on the SPRING framework (e.g., an application framework and inversion of control container for a Java programming language platform), JavaScript Object Notation (JSON) parsing which is part of a lightweight data-interchange format, annotations, etc.

Thus, each time the example application is packaged at a client device 110 (e.g., a developer machine) the packaged application is transmitted to a PaaS-like infrastructure where the package is received at a controller. Thus, in this example, the total file size of the packaged application is 5100 KB. Each time a developer edits the core application (e.g., the 100 KB portion), all of the files have to be repackaged and deployed and thus 5100 KB of data will be sent for each revision. By sending each file for every revision, a lot of North-South traffic is generated especially in cases when multiple developers are simultaneously developing applications or working on a same application. For example, with 1000 people deploying apps at, or about, the same time and doing say 5 revisions each day, around 250 GB of North-South traffic may be generated over the internet each day. The embodiments described herein relate to a process via which this traffic may be reduced to a much smaller amount and which may result in considerable cost savings.

Figure 2:
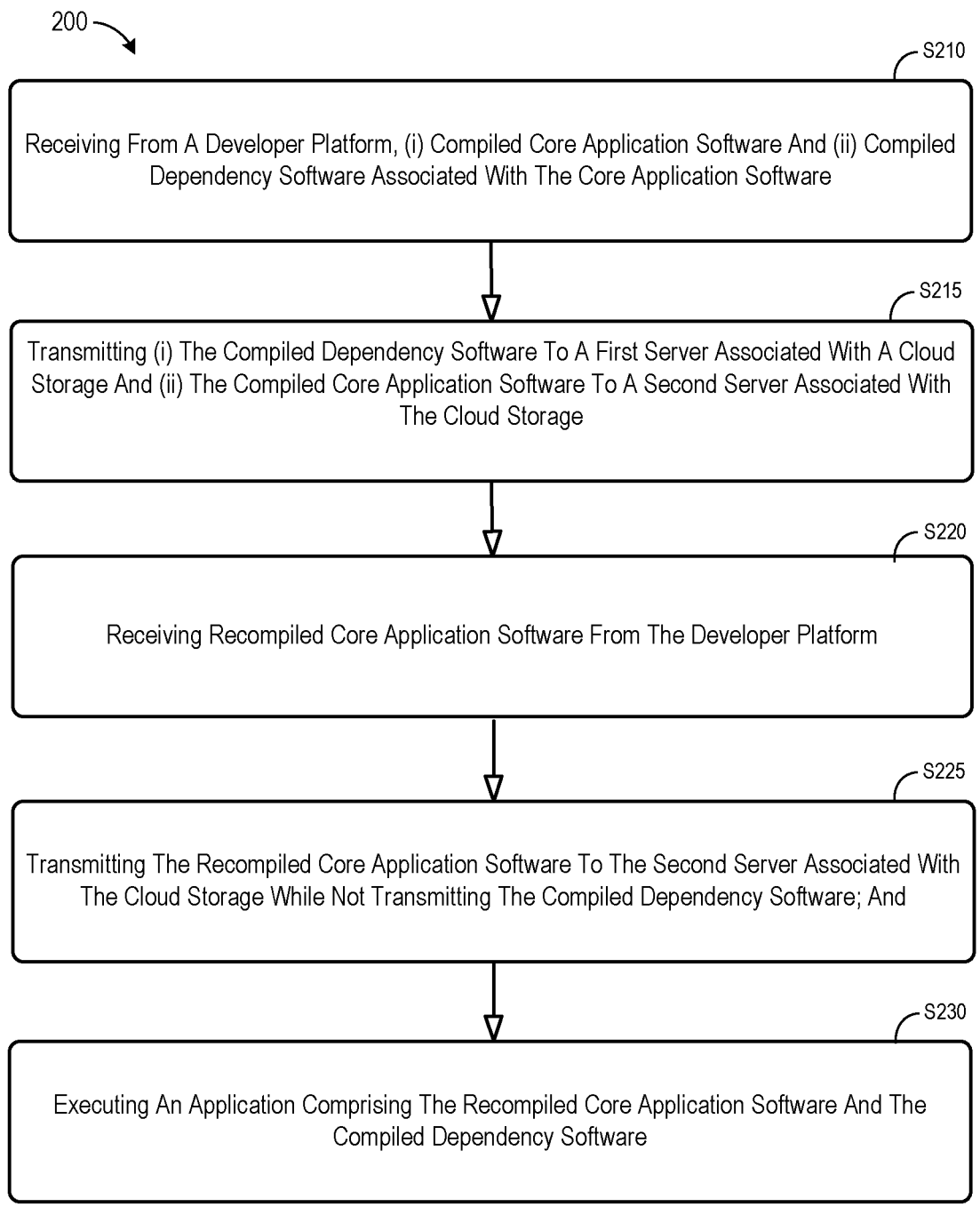
FIG. 2 is a flow diagram of a process according to some embodiments.

FIG. 2 comprises a flow diagram of process 200 according to some embodiments. In some embodiments, various hardware elements of system 100 execute program code to perform process 200. Process 200, and all other processes mentioned herein, may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments.

Although process steps may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Compiled core application software and compiled dependency software associated with the core application software may be received at S210. The compiled core application software and compiled dependency software associated with the core application software may be received at a controller. Compiling may be performed via a processor, at a developer platform. The core application software may comprise program code that defines a particular application or process. The dependency software may comprise additional software elements that may be called by the core application software such as, but not limited to, SPRING or JSON parsing.

Figure 3:
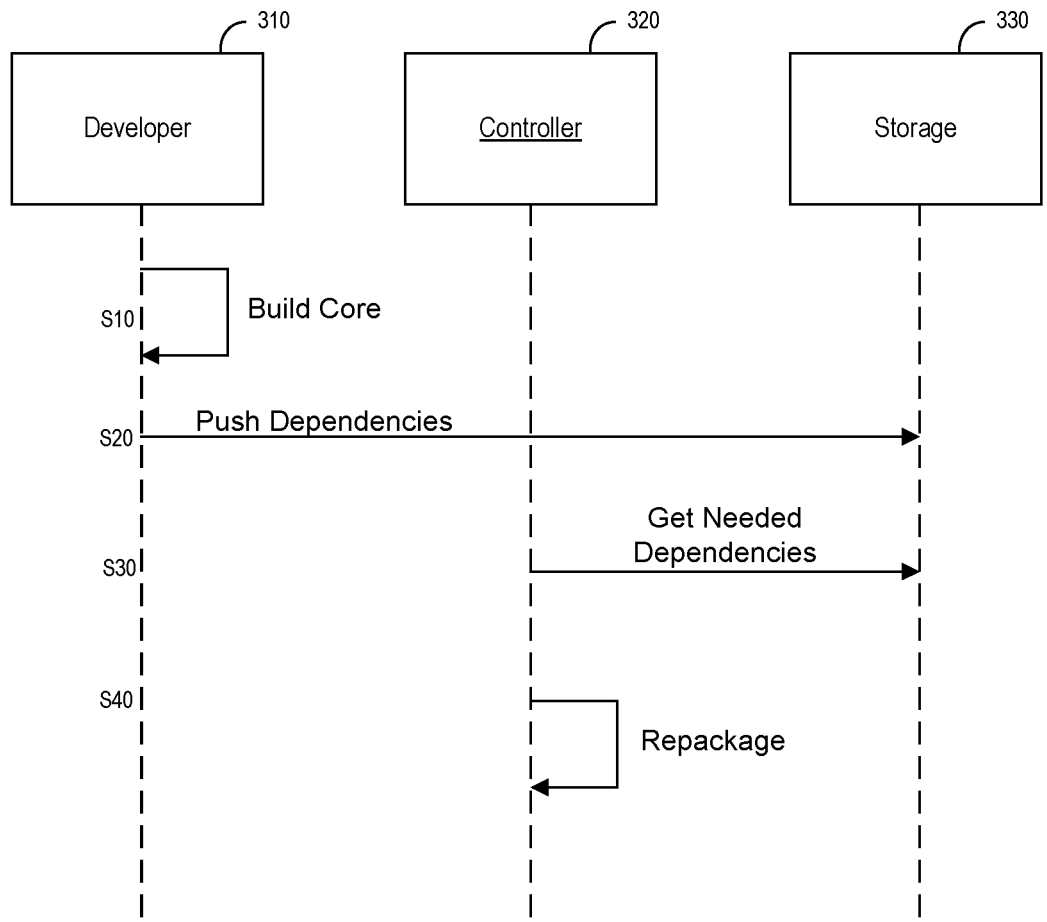
FIG. 3 is a diagram of a process according to some embodiments.

Referring now to FIG. 3, a process 300 is illustrated according to some embodiments. Continuing with the above example, the core application software may be compiled and the dependency software may also be compiled. As illustrated at S10, core application software may be compiled at a developer platform 310.

Referring back to FIG. 2, at S215, the compiled dependency software may be transmitted to a first server associated with a cloud storage system. Furthermore, the compiled core application software may be transmitted to a second server associated with the cloud storage. In some embodiments, a controller may determine where to store the compiled core application software and the compiled dependency software.

Continuing with the above example, the compiled dependency software may be pushed to a server associated with the cloud storage system as illustrated at S20 of FIG. 3. In some embodiments, if no changes are needed to the core application software, the core application software may also be pushed to the cloud storage system. The complete application software (e.g., the compiled core application software and the compiled dependency software) may be packaged together and then executed. Packaging may comprise the use of a web application archive (WAR) which, in some embodiments, may be defined as a Java Archive (JAR) file used to distribute a collection of Java Server Pages, Java Servlets, Java classes, XML files, tag libraries, static web pages (HTML and related files) and other resources that together constitute a web application.

Since the dependency software and the core application software may be stored separately, in order to reference the dependency software, the core application software may unitize calls to the dependency software within the core application software. The core application software may utilize calls that have been modified with a unique identifier since the compiled core application software and the compiled dependency software may be stored separately. In some embodiments, the compiled core application software may reference the compiled dependency software in the compiled core application software using a unique identifier, such as, but not limited to, a hash function which may map the compiled core application software to the compiled dependency software. For example, dependencies may be pushed to a blobstore with a key as a hash of a specific dependency jar. This may be achieved by packaging reusable pieces of build logic which may be used across many different projects and builds (e.g., a MAVEN or GRADLE plugin) by intercepting a build phase of a Java artifact. In other embodiments, the unique identifier may comprise a globally unique identifier (GUID) where each GUID may comprise, for example, a 128-bit value.

Once an application is completed, built and packaged, it may be pushed for deployment. Depending on a cloud management layer (e.g., a PaaS Controller), a pre deploy hook may be invoked to check a dependency (e.g, JSON) within each web artifact (e.g., each portion of the core application software) and then the needed dependencies may be pulled from storage (e.g., a blobstore) to repackage a WAR file. Since this aspect may be associated with a deployment activity, it may be triggered totally within a data center which creates East-West traffic within the data center. Being limited to the data center, internal networks may be scaled more easily.

In many cases, software development requires tweaks and revisions and multiple versions of the core application software may be produced prior to a final version. Thus, after each revision of the core application software, the core application software is recompiled at the developer platform and received at S220. The recompiled core application software may be received at the controller. For example, a developer may find a typographical error in the software code. The developer may then recompile the code associated with the core application software to create a new version of the core software application. Once the code associated with the core application software is recompiled, the recompiled core application software may be transmitted to the second server associated with the cloud storage while not transmitting the compiled dependency software at S225.

As described previously, in conventional systems, the recompiled core application software is packaged with the compiled dependency software and the package is then transmitted to the cloud storage. Using the values from the above example, in conventional systems, each time an application is packaged at a client device (e.g., a developer machine) and deployed to the cloud (e.g., a PaaS Controller) the file size is 5100 KB. However, as described in the present embodiments, since only the core application software is being recompiled and transmitted, the file that is being transmitted is only 100 KB which is a savings of 5000 KB per upload.

At S230 an application is executed where the application comprises the recompiled core application software and the compiled dependency software. In some embodiments, prior to execution, the recompiled core application software and the compiled dependency software may be repackaged together.

Continuing with the above example, and again referring to FIG. 3, the core application software may be recompiled and transmitted to the controller 320. As S30, the controller may determine, based on a unique identifier, which dependencies are needed by the core application software. The needed dependencies may be retrieved from storage 330 (e.g., a server in a data center) and the needed dependencies may be transmitted to the controller 320 where they are repackaged with the recompiled core application software. Since all of the traffic within the data center is East-West traffic, North-South traffic may be reduced.

In some embodiments, multiple developers may use a same set of compiled dependency software for an application. For example, if three different developers were using the same set of compiled dependency software, network bandwidth savings would be increased by 300%. In this situation, each developer would be sending only compiled core application software at 100K instead of the compiled dependency software which is 5000K. Thus, for each version of the compiled core application software being sent, 5000K less data is being transmitted for each revision and each developer.

Figure 4:
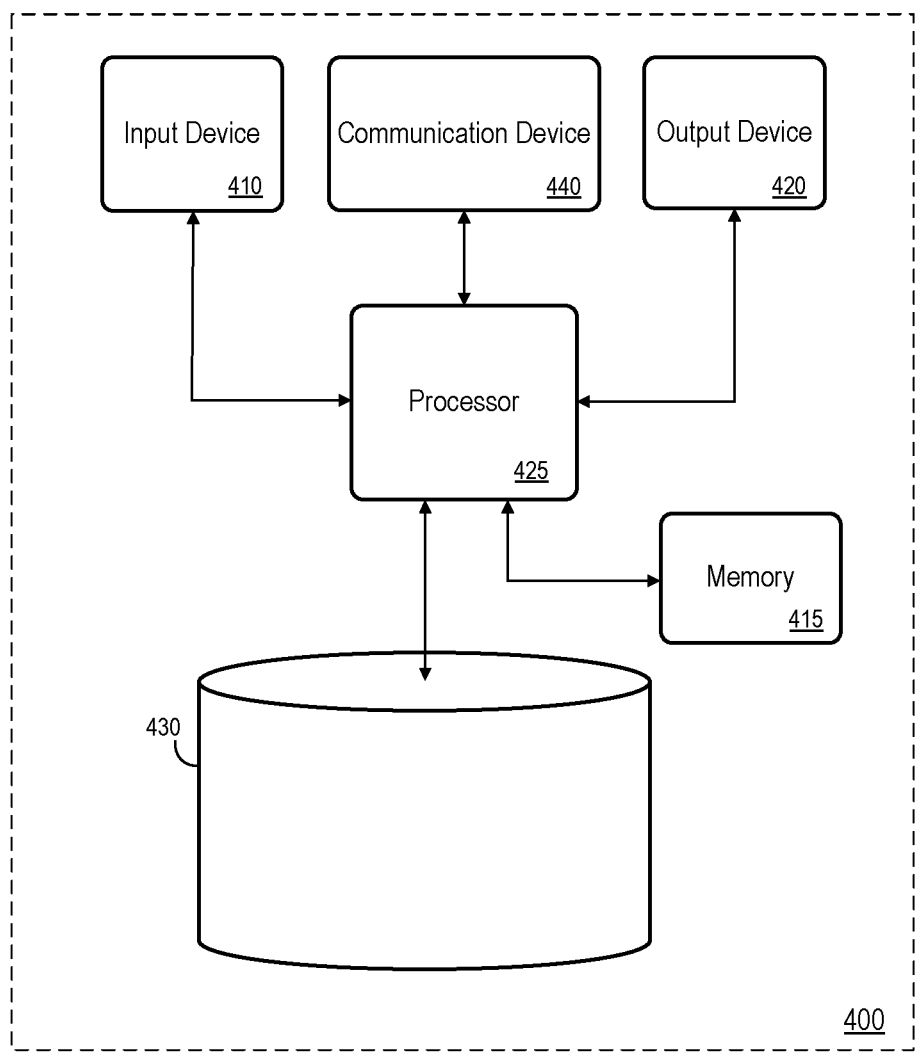
FIG. 4 is a block diagram of an apparatus according to some embodiments.

FIG. 4 is a block diagram of apparatus 400 according to some embodiments. Apparatus 400 may be associated with a cloud storage system or a controller, such as a PasS controller. Apparatus 400 may comprise a processor 425 that executes program code to perform any of the processes described herein. Apparatus 400 may include other unshown elements according to some embodiments.

Apparatus 400 includes processor 425 operatively coupled to memory 415, data storage device 430, an input device 410, an output device 420 and memory 415. Communication device 440 may facilitate communication with external devices, such as a reporting client, or a data storage device. Input device(s) 410 may comprise, for example, a keyboard, a keypad, a mouse or other pointing device, a microphone, knob or a switch, an infra-red (IR) port, a docking station, and/or a touch screen. Input device 410 may be used, for example, to enter information into apparatus 400. Output device 420 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Data storage device 430 may comprise program code that executed by processor 425 to cause apparatus 400 to perform any one or more of the processes described herein. Embodiments are not limited to execution of these processes by a single apparatus. Data storage device 430 may also include one or more database tables 440 for use with process 200. For example, the database tables 440 may store information associated with dependency software.

FIG. 5 is a tabular view of a portion of a database 500 in accordance with some embodiments of the present invention. In some embodiments, the database 500 may relate to compiled dependency software. The table includes entries associated with compiled dependency software. The table also defines fields 502, 504, 506, and 508 for each of the entries. The fields specify: a dependency software ID 502, a first dependency software attribute 504, a second dependency software attribute 506 and an Nth dependency software attribute 508. The information in the database 500 may be periodically created and updated based on information collection during operation of servers as they are received.

The dependency software ID 502 might be a unique alphanumeric code identifying a specific dependency software and the software attributes 504/506/508 might provide information related to dependency software such as, but not limited to, a name, a hash or other unique identifier, a developer name, function, one or more default parameters, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A method of application development, the method comprising:
at a cloud storage system, receiving from a developer platform a first transmission having a first file size, the first transmission including a first version of a compiled core application software and a compiled dependency software, the compiled dependency software associated with the first version compiled core application software, the developer platform remote from the cloud storage system across a first network;

receiving at the cloud storage system a second transmission having a second file size, the second transmission including a second version of the compiled core application software, the second transmission excluding the compiled dependency software;

the second version compiled core application software including edits not included in the first version compiled core application software, the second file size being less than the first file size;

modifying one or more respective calls to the compiled dependency software with a unique identifier, the respective calls located in the first version compiled core application software and the second version compiled core application software, the respective calls mapping the compiled dependency software to the first version compiled core application software and the second version compiled core application software;

transmitting, via a processor, the compiled dependency software to a first server associated with the cloud storage system and the second version compiled core application software to a second server associated with the cloud storage system, the first server and the second server in communication across a network internal to the cloud storage system, wherein a portion of traffic on the first network is shifted to the internal network;

at the cloud storage system, packaging the compiled dependency software with the second version compiled core application software to create a complete application software package; and executing the complete application software package.

2. The method of claim 1, further comprising:
receiving recompiled core application software from the developer platform;
transmitting the recompiled core application software to the second server associated with the cloud storage; and
executing an application based on the recompiled core application software and the compiled dependency software.

3. The method of claim 1, wherein prior to executing the application based on the compiled core application software and the compiled dependency software, packaging the compiled core application and the compiled dependency software.

4. The method of claim 3, wherein the packaging is a web application archive ("WAR") file.

5. The method of claim 1, wherein the first server associated with the cloud storage and the second server associated with the cloud storage are different servers.

6. The method of claim 1, wherein the core application software is based on a Java programming language.

7. The method of claim 1, wherein the compiled dependency software is an application framework and inversion of control container for a Java programming language platform.

8. The method of claim 1, wherein the compiled core application software references the compiled dependency software via a unique identifier.

9. The method of claim 1, further comprising:
receiving recompiled core application software from the developer platform;
transmitting the recompiled core application software to the second server associated with the cloud storage while not transmitting the compiled dependency software; and executing an application based on the recompiled core application software and the compiled dependency software.

10. A non-transitory computer-readable medium comprising processor executable steps that when executed by a processor perform a method of application development, the method comprising:
at a cloud storage system receiving, from a developer platform, a first transmission having a first file size, the first transmission including a first version of a compiled core Java application software and a compiled Java dependency software, the compiled Java dependency software associated with the first version compiled Java core application software, the developer platform remote from the cloud storage system across a first network;

receiving at the cloud storage system a second transmission having a second file size, the second transmission including a second version of the compiled core application software, the second transmission excluding the compiled dependency software;

the second version compiled core application software including edits not included in the first version compiled core application software, the second file size being less than the first file size;

modifying one or more respective calls to the compiled dependency software with a unique identifier, the respective calls located in the first version compiled core application software and the second version compiled core application software, the respective calls mapping the compiled dependency software to the first version compiled core application software and the second version compiled core application software;

transmitting, via a processor, the compiled Java dependency software to a first server associated with the cloud storage system and the second version Java compiled core application software to a second server associated with the cloud storage system, the first server and the second server in communication across a network internal to the cloud storage system, wherein a portion of network traffic is shifted from the first network to the internal network;

at the cloud storage system, packaging the compiled Java dependency software with the second version compiled core Java application software to create a complete application software package; and executing the complete application software package.

11. The medium of claim 10, wherein prior to executing the application based on the compiled Java core application software and the compiled Java dependency software, packaging the compiled Java core application and the Java compiled dependency software in a web application archive ("WAR") file.

12. The medium of claim 10, wherein the first server associated with the cloud storage and the second server associated with the cloud storage are different servers.

13. The medium of claim 10, wherein the compiled Java dependency software is an application framework and inversion of control container.

14. The medium of claim 10, wherein the compiled Java core application software references the compiled Java dependency software via a unique identifier.

15. A system for application development, the system comprising:
a processor; and
a non-transitory computer-readable medium comprising processor executable steps that when executed by a processor perform a method of application development, the method comprising:

at a cloud storage system receiving, from a developer platform, a first transmission having a first file size, the first transmission including a first version of a compiled core Java application software and a compiled Java dependency software, the compiled Java dependency software associated with the first version compiled Java core application software, the developer platform remote from the cloud storage system across a first network;

receiving at the cloud storage system a second transmission having a second file size, the second transmission including a second version of the compiled core application software, the second transmission excluding the compiled dependency software;

the second version compiled core application software including edits not included in the first version compiled core application software, the second file size being less than the first file size;

modifying one or more respective calls to the compiled dependency software with a unique identifier, the respective calls located in the first version compiled core application software and the second version compiled core application software, the respective calls mapping the compiled dependency software to the first version compiled core application software and the second version compiled core application software;

transmitting, via a processor, the compiled Java dependency software to a first server associated with the cloud storage system and the second version Java compiled core application software to a second server associated with the cloud storage system, the first server and the second server in communication across a network internal to the cloud storage system, wherein a portion of network traffic is shifted from the first network to the internal network;

at the cloud storage system, packaging the second version compiled Java core application and the Java compiled dependency software in a web application archive ("WAR") file to create a complete application software package; and executing the complete application software package.

16. The system of claim 15, wherein the first server associated with the cloud storage and the second server associated with the cloud storage are different servers.

17. The system of claim 15, wherein the compiled Java dependency software is an application framework and inversion of control container.

18. The system of claim 15, wherein the compiled Java core application software references the compiled Java dependency software via a unique identifier.

* * * * *